April 30, 1963  E. T. ARMSTRONG  3,087,221
HOSE CLAMP

Filed May 15, 1959  3 Sheets-Sheet 1

INVENTOR.
EDWARD T. ARMSTRONG
BY Oldham & Oldham
ATTYS.

April 30, 1963 E. T. ARMSTRONG 3,087,221
HOSE CLAMP

Filed May 15, 1959 3 Sheets-Sheet 2

INVENTOR.
EDWARD T. ARMSTRONG
BY Oldham & Oldham
ATTYS.

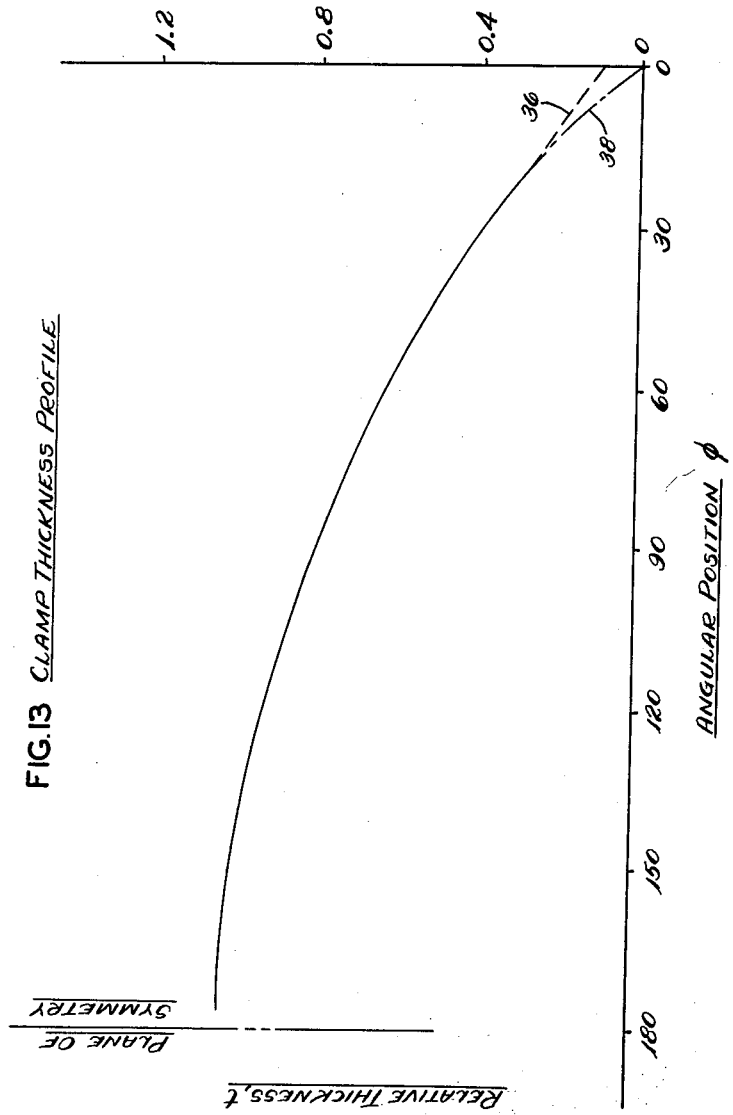

United States Patent Office 3,087,221
Patented Apr. 30, 1963

3,087,221
HOSE CLAMP
Edward T. Armstrong, 490 Pepperidge Tree Terrace,
Smoke Rise, Butler, N.J.
Filed May 15, 1959, Ser. No. 813,484
2 Claims. (Cl. 24—279)

This invention relates to hose clamps and the like, and, more particularly, is concerned with hose clamps adapted to apply circumferentially uniform clamping pressure.

It has been proposed heretofore to employ hose clamps comprising an endless band of metal adapted to be crimped at one or more points around its circumference to thereby reduce the diameter of the clamp and secure a plastic hose end, for example, to a tube. Such known hose clamps for example, as shown in U.S. Patent No. 2,614,304 as they are reduced in diameter by the crimping action do not maintain a fully circular internal shape either initially or as they are closed with the result that the pressure exerted by the clamp against the hose and tube end is not circumferentially uniform.

It is the general object of the invention to avoid and overcome the foregoing and other difficulties of and objections to prior art practices by the provision of an improved hose clamp which initially and when increased or reduced in diameter maintains a fully circular contour so as to provide circumferentially uniform clamping pressure.

Another object of the invention is to provide a relatively inexpensive, easily applied hose clamp providing more effective sealing action between a hose and a member to which the hose is clamped.

The foregoing objects of the invention, and other objects which will become apparent as the description proceeds, are achieved by the provision in combination of a tube end, a plastic hose surrounding the tube end, a metal band around the hose, said metal band being of greatest radial thickness near its middle and having progressively reduced radial thickness towards its ends so as to maintain a true circle initially and upon change of diameter, and means joining the ends of the bands together to clamp the hose with uniform circumferential pressure against the tube end.

For a better understanding of the invention reference should be had to the accompanying drawings wherein FIG. 1 is a plan view of one embodiment of a hose clamp incorporating the principles of the invention, and showing the clamp in the open position;

FIG. 13 is a graphical showing of clamp thickness at any angle from the plane of symmetry.

Having more particular reference to the drawings, the numeral 10 indicates generally a hose clamp having a body portion 12 bent into circular form and with the body portion 12 being thickest in a radial direction at its middle and having progressively reduced radial thickness towards the ends 14 of the body portion. The change in radial thickness of the body portion 12 of the clamp is such that as the ends 14 of the body portion are moved toward or away from each other the inside surface or periphery of the clamp is maintained fully circular.

Means are provided for joining together the ends 14 of the body portion 12, and in the form of the invention illustrated these means constitute an integral U-shaped portion 16 in the manner illustrated.

Figure 1:
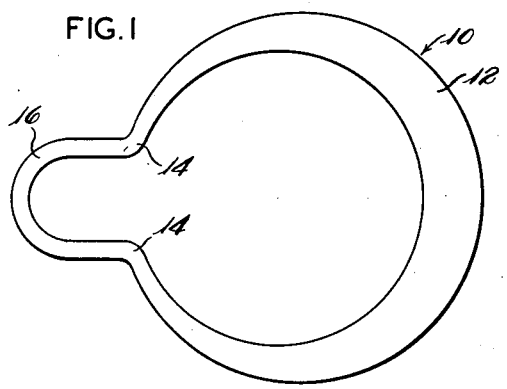
Figure 2:
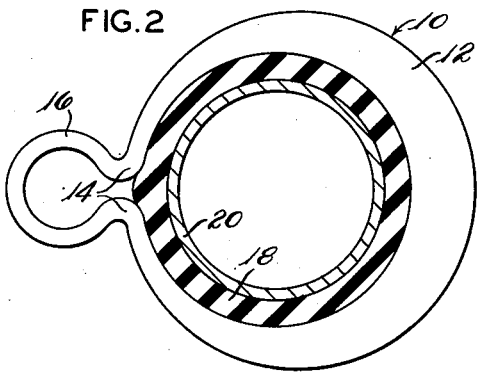
FIG. 2 is a view similar to FIG. 1 and illustrating the clamp thereof when in closed or crimped position to secure a hose to a tube.

FIG. 1 shows the clamp 10 in the open or unclamped position whereas FIG. 2 illustrates the same clamp 10 in the crimped or clamping position to secure a hose 18 to the end of a tube 20. This is normally accomplished by crimping the U-shaped portion 16 into substantially the shape shown in FIG. 2 to elastically reform the material of the portion 16. Thus, the diameter of the circular body portion 12 is reduced to effect a tight clamping of the hose 18 about the end of the tube 20 with a circumferentially uniform pressure due to the fact that the body portion 12 of the clamp at all times maintains fully circular contour over its inner surface or periphery in contact with the hose 18.

Figure 3:
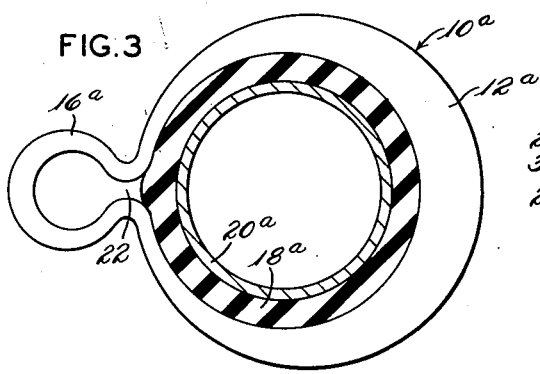
FIG. 3 is a view similar to FIG. 2 but illustrating another form of the invention.

The embodiment of the invention illustrated in FIG. 3 is indicated as a whole by the numeral 10a, and differs from the form of the invention shown in FIG. 2 only by making the crimped portion 16a of the hose clamp in the same manner as the body portion 12a of the clamp, i.e., of greatest radial thickness opposite to the narrow neck 22 and a gradually reduced radial thickness towards the narrow neck 22 so that both the clamping portion 16a and the body portion 12a during the crimping action and thereafter still maintain inner surfaces or peripheries of true circular shape so as to effect a uniform and positive clamping of the hose 18a against the tube end 20a.

Figure 4:
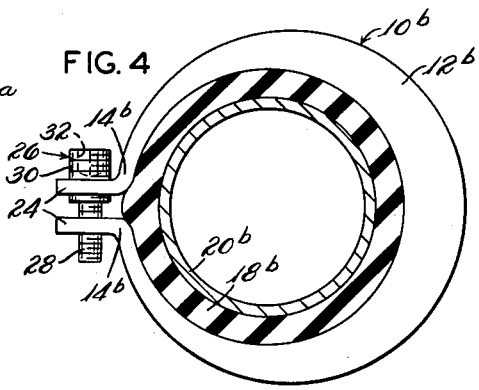
FIG. 4 is a view similar to FIG. 3 but illustrating another embodiment of the invention.

FIG. 4 shows a clamp indicated as a whole by the numeral 10b having a body portion 12b of greatest thickness at its middle and of gradually reduced radial thickness towards the ends 14b, the ends of the body portion terminating in flanges 24 connected together by adjustable screw means 26. The screw means 26 may take the form of a differential screw having a smaller diameter portion 28 threaded into one flange 24 and a larger diameter portion 30 threaded with a thread of different pitch into the other flange 24. The screw means 26 has a socket 32 at one end for receiving an Allen set screw wrench to tighten the clamp 10b against a hose 18b to secure it in sealing relation with a tube end 20b.

Figure 5:
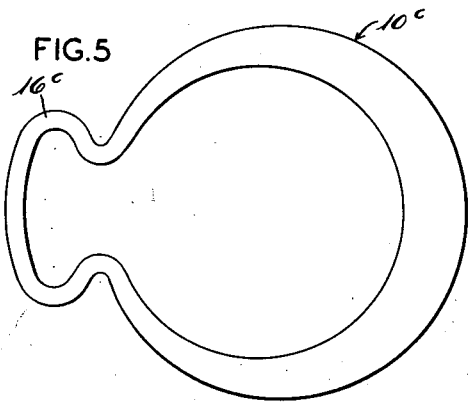
FIG. 5 is a view like FIG. 1 but of another embodiment of the invention.
Figure 6:
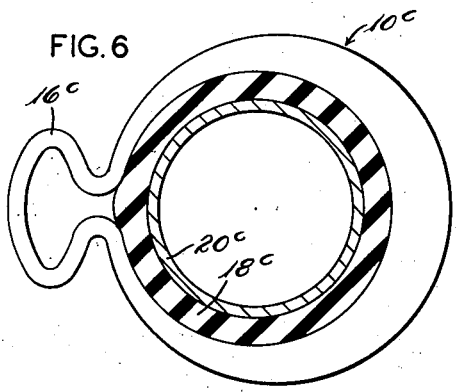
FIG. 6 is a view of the clamp of FIG. 5 in the closed or crimped position.

FIGS. 5 and 6 illustrate a hose clamp 10c in the unclamped position in FIG. 5 and in the clamped position in FIG. 6. The portion 16c of the clamp 10c is in the shape of an ellipse both before and after the crimping operation, with the major axis of the ellipse being on the order of twice the distance of the minor axis of the ellipse. This insures greater strength and rigidity in a circumferential direction than the substantially circular shape of the portion 16 shown in FIG. 2, and normally gives stronger clamping pressures to hold the hose 18c against the tube end 20c.

Figure 7:
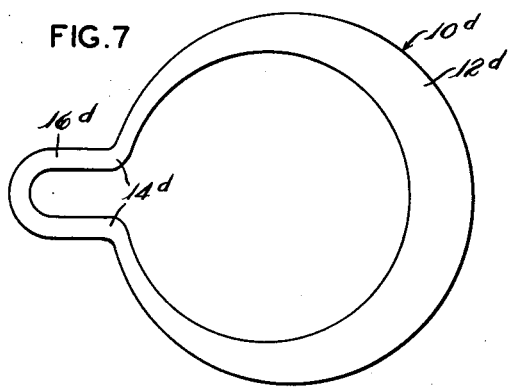
FIGS. 7 and 8 show still another form of clamp in the unclamped and clamped positions respectively.
Figure 8:
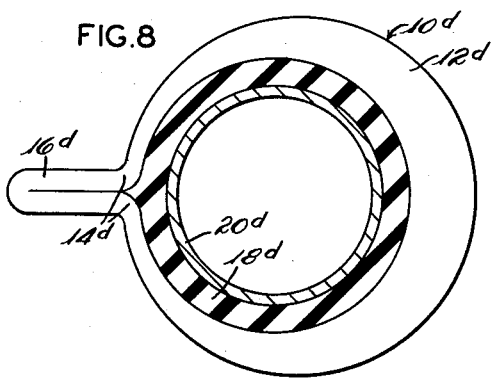

FIGS. 7 and 8 show respectively the unclamped and the clamped shape of a hose ring 10d formed as heretofore described with relation to the body portion 12d, that is of progressively less radial thickness from the middle of the body portion 12d to the ends 14d. The integral portion 16d joining the ends 14d together is of U-shape like the portion 16 of FIG. 1, but with the legs of the U being more closely spaced together in the manner illustrated. Thus, when the portion 16d is crimped to clamp position, as seen in FIG. 8, the legs of the U-shaped portion 16d are flattened tightly against each other, substantially in accord with the showing in British Patent No. 208,288 to squeeze the hose 18d against the tube end 20d with circumferentially uniform clamping pressure.

Figure 9:
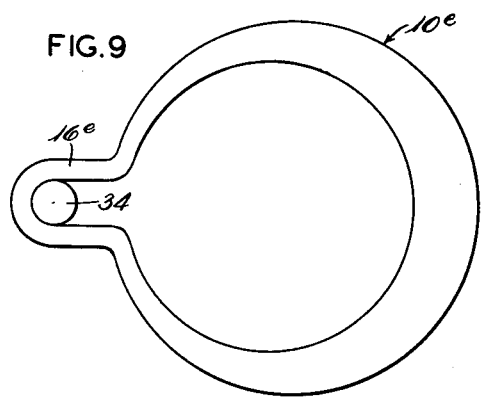
FIGS. 9 and 10 show still another embodiment of the invention in unclamped and clamped position.
Figure 10:
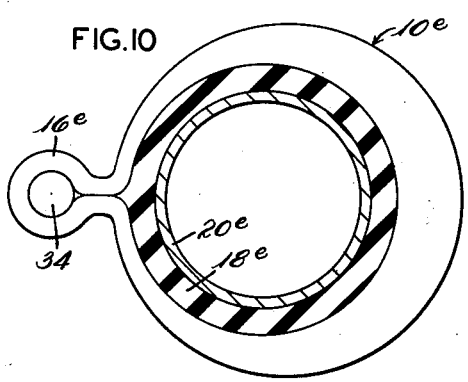

In the form of the invention shown in FIGS. 9 and 10, FIG 9 shows a hose clamp 10e in the unclamped or open position whereas FIG. 10 shows the same clamp 10e in the clamping position. This form of the invention is like that shown in FIG. 7 except that a round rod 34 is positioned in the bottom of the U-shaped portion 16e, the rod 34 having an axial length equal to the width of the clamp ring 10e. When the open clamp ring is crimped into clamping position, as shown in FIG. 10, the portion 16e is crimped down to substantially the position shown in FIG. 10 with the legs of the U-shaped portion 16e touching or substantially touching to circumferentially clamp in very uniform manner the hose 18e against the tube end 20e.

Figure 11:
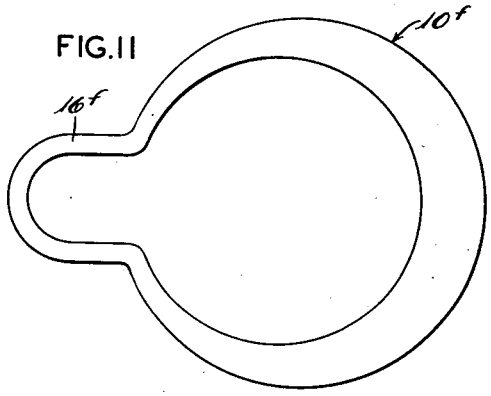
FIGS. 11 and 12 show another embodiment of the invention in the unclamped and clamped positions respectively.
Figure 12:
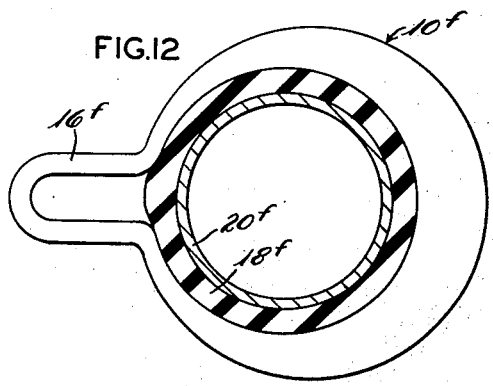

FIGS. 11 and 12 show respectively the unclamped and the clamped positions of a hose ring 10f, the hose ring 10f being substantially a duplicate in unclamped or open position of the hose ring of FIG. 1. However, in crimping the portion 16f to clamp position the portion 16f is merely flattened to substantially the shape shown in FIG. 12 to effect a substantially uniform clamping of the hose 18f against the tube end 20f. This type of crimping is that taught in French Patent No. 603,821.

None of the figures of the drawing illustrate the axial length of the hose clamp of the invention. Suffice it to say here that the hose clamp of the invention can be made in any one of a variety of axial lengths, but that usually the axial length of the hose clamp is constant and is between about a quarter and about one-half of the internal diameter of the clamp. As the drawing illustrates, the ends of the clamp are flat to provide a rectangular cross section.

In the actual construction of the improved clamp of the invention the thickness of the ring of the clamp at any angle can be expressed by the following formula:

$$t = a \sin^{0.666} \phi/2$$

Wherein
$t$ = the thickness
$a$ = a constant such as a unit 1
$\phi$ = the angle with a clamp radius drawn through the split FIG. 13 graphically illustrates the dimensions of a typical clamp ring constructed in accord with the preceding formula. The dotted line 36 shows the only departure from the formula to occur at the extreme end of the curve in the area of the thin ends of the clamp. The chain dotted portion 38 of the curve is not used.

Although the invention has been specifically illustrated and described as clamping a plastic hose to a tube end, it will be recognized that it can be employed to clamp almost any type of tube to another as long as the larger tube can be deformed by the strength of the clamp or the clamp compressing operation to effect a seal between the tubes.

While in accord with the patent statutes certain embodiments of the invention have been illustrated and described in detail, it is to be particularly understood that the invention is not to be limited thereto or thereby, but that its scope is defined in the appended claims.

What is claimed is:

1. A combination, a tube end, a plastic hose surrounding the tube end, a metal band around the hose, said metal band being of greatest radial thickness near its middle and having progressively reduced radial thickness towards its adjacent ends so as to maintain an internal true circle initially and upon change of diameter, said band having a radial thickness which substantially changes in accordance with the $\sin^{0.666}\phi/2$ where $\phi$ equals the angle between a radius passing through the center of the space between its ends and a selected radius passing through a selected point on said band, means joining the ends of the band together to clamp the hose with uniform circumferential pressure against the tube end, said metal band having parallel flat sides and a constant axial length between the flat sides of between about one quarter and about one half of the diameter of the band to provide a rectangular cross section on any radial plane extending from the axis of the band.

2. In combination, a tube end, a plastic hose surrounding the tube end, a metal band around the hose, said metal band having parallel sides and being of greatest radial thickness near its middle and having progressively reduced radial thickness towards its ends so as to maintain a true internal circle upon change of diameter, and integral endless elliptically-shaped means joining the ends of the band together, said means being adapted to be crimped into an ellipse of smaller shape having its major axis substantially parallel to a tangent at the ends of the band to reduce the diameter of the band while the inside is maintained circular to clamp the hose with uniform circular pressure against the tube end.

References Cited in the file of this patent
UNITED STATES PATENTS

| | | |
|---|---|---|
| 2,109,517 | Xenis | Mar. 1, 1938 |
| 2,285,850 | Weeks | June 9, 1942 |
| 2,352,372 | Colarusso | June 27, 1944 |
| 2,574,034 | Heimann | Nov. 6, 1951 |
| 2,614,304 | Oetiker | Oct. 21, 1952 |

OTHER REFERENCES

Timoshenko: "Strength of Materials," Part II, pages 446 and 447 N.Y: D. Van Nostrand Co., Inc., 1930. TA405. T5 (1930).